(12) United States Patent
Leshem et al.

(10) Patent No.: US 12,549,468 B2
(45) Date of Patent: Feb. 10, 2026

(54) FORWARDING TABLE WITH OVERRIDE

(71) Applicant: MELLANOX TECHNOLOGIES, LTD., Yokneam (IL)

(72) Inventors: Roee Levy Leshem, Tel Aviv (IL);
Lior Hodaya Bezen, Tel Aviv (IL);
Itamar Rabenstein, Petach Tikva (IL);
Uriel David Vanunu, Tel Aviv (IL);
Eyal Srebro, Kfar Yehoshua (IL); Yafa Sheindel Reiman, Petach Tikva (IL);
Lirel Rachel Vainer, Or Yehuda (IL)

(73) Assignee: Mellanox Technologies, Ltd, Yokneam (IL)

(*) Notice: Subject to any disclaimer, the term of this patent is extended or adjusted under 35 U.S.C. 154(b) by 498 days.

(21) Appl. No.: 18/169,897

(22) Filed: Feb. 16, 2023

(65) Prior Publication Data
US 2024/0283729 A1    Aug. 22, 2024

(51) Int. Cl.
*H04L 45/02* (2022.01)
*H04L 45/00* (2022.01)
*H04L 45/16* (2022.01)

(52) U.S. Cl.
CPC .............. *H04L 45/02* (2013.01); *H04L 45/16* (2013.01); *H04L 45/54* (2013.01)

(58) Field of Classification Search
CPC .......... H04L 45/02; H04L 45/16; H04L 45/54
USPC ...................................................... 370/390
See application file for complete search history.

(56) References Cited

U.S. PATENT DOCUMENTS

| | | | |
|---|---|---|---|
| 8,259,726 B2 * | 9/2012 | Subramanian | H04L 45/54 370/392 |
| 10,382,328 B1 * | 8/2019 | Whittaker | H04L 45/745 |
| 10,404,619 B1 * | 9/2019 | Agrawal | H04L 45/48 |
| 11,563,668 B1 * | 1/2023 | Ramabadran | H04L 63/101 |
| 2008/0062891 A1 * | 3/2008 | Van der Merwe | H04L 45/42 370/254 |
| 2011/0205931 A1 * | 8/2011 | Zhou | H04L 47/10 370/253 |

(Continued)

FOREIGN PATENT DOCUMENTS

| | | | | |
|---|---|---|---|---|
| EP | 2773070 A1 * | 9/2014 | | H04L 12/185 |
| WO | WO-2016033785 A1 * | 3/2016 | | H04L 45/021 |

OTHER PUBLICATIONS

Bezen et al., U.S. Appl. No. 18/113,282, filed Feb. 23, 2023.
Bezen et al., U.S. Appl. No. 18/162,195, filed Jan. 31, 2023.
Leshem et al., U.S. Appl. No. 18/116,115, filed Mar. 1, 2023.

*Primary Examiner* — Anthony Mejia
(74) *Attorney, Agent, or Firm* — Meitar Patents Ltd.; Daniel Kligler

(57) ABSTRACT

In one embodiment, a network switch device includes a network interface comprising ingress ports and egress ports, and configured to receive forwarding-table-configuration packets from a network management node, a processor to form a forwarding table based on the received forwarding-table-configuration packets, generate a forwarding-table-override configuration for a given ingress port of the ingress ports to override at least one forwarding rule of the forwarding table for the given ingress port, and install the forwarding table and the forwarding-table-override configuration for use by the given ingress port, and forwarding circuitry to forward packets received at the given ingress port based on the forwarding table overridden by the forwarding-table-override configuration.

24 Claims, 4 Drawing Sheets

(56) References Cited

U.S. PATENT DOCUMENTS

| | | | |
|---|---|---|---|
| 2013/0287027 A1* | 10/2013 | Ra | H04L 45/745 370/392 |
| 2013/0287039 A1* | 10/2013 | Bragg | H04L 45/54 370/419 |
| 2019/0230025 A1* | 7/2019 | Kommula | H04L 41/0895 |
| 2022/0103425 A1* | 3/2022 | Lo | H04L 12/4641 |
| 2024/0283729 A1* | 8/2024 | Leshem | H04L 45/54 |
| 2024/0297843 A1* | 9/2024 | Leshem | H04L 45/24 |
| 2025/0007742 A1* | 1/2025 | Raj | H04L 12/18 |

\* cited by examiner

FORWARDING TABLE WITH OVERRIDE

FIELD OF THE INVENTION

The present invention relates to computer systems, and in particular, but not exclusively to, forwarding packets.

BACKGROUND

Network switches forward packets over a network according to decisions rendered based on forwarding tables loaded on the switches. In some cases, the forwarding decisions are relatively straightforward and a single forwarding table per switch suffices to provide the relevant forwarding decisions for a switch. In other cases, forwarding decisions may be more complicated and multiple forwarding tables may be needed for a switch with different forwarding tables for different ingress ports. One such example that leads to more complicated forwarding is a reduction and aggregation process, discussed in more detail below.

A network node, such as a graphics processing unit (GPU), may initiate a parallel computing job with other GPUs across a network. In addition to the other GPUs participating in the parallel computing job, switches in the network may also participate in the parallel computing job by providing the various GPUs with the necessary data to perform the parallel computing job and also by performing such tasks as addition. The switches may perform reduction processing (e.g., summing two numbers together) and aggregation of data received from other network switches and/or GPUS.

An example of reduction and aggregation is provided in U.S. Pat. No. 10,284,383 to Bloch, et al., which describes a switch in a data network configured to mediate data exchanges among network elements. The apparatus further includes a processor, which organizes the network elements into a hierarchical tree having a root node network element, vertex node network elements, and child node network elements that include leaf node network elements. The leaf node network elements originate aggregation data and transmit the aggregation data to respective parent vertex node network elements. The vertex node network elements combine the aggregation data from at least a portion of the child node network elements, and transmit the combined aggregation data from the vertex node network elements to parent vertex node network elements. The root node network element is operative for initiating a reduction operation on the aggregation data.

SUMMARY

There is provided in accordance with still another embodiment of the present disclosure, a network switch device, including a network interface including ingress ports and egress ports, and configured to receive forwarding-table-configuration packets from a network management node, a processor to form a forwarding table based on the received forwarding-table-configuration packets, generate a forwarding-table-override configuration for a given ingress port of the ingress ports to override at least one forwarding rule of the forwarding table for the given ingress port, and install the forwarding table and the forwarding-table-override configuration for use by the given ingress port, and forwarding circuitry to forward packets received at the given ingress port based on the forwarding table overridden by the forwarding-table-override configuration.

Further in accordance with an embodiment of the present disclosure the processor is to generate the forwarding-table-override configuration for the given ingress port to indicate how the forwarding table is to be overridden.

Still further in accordance with an embodiment of the present disclosure the processor is to generate the forwarding-table-override configuration for the given ingress port to indicate how selected data of the forwarding table is to be ignored and/or validated.

Additionally in accordance with an embodiment of the present disclosure the processor is to generate different forwarding-table-override configurations for different corresponding ones of the ingress ports to override forwarding rules of the forwarding table, and install the forwarding table and the forwarding-table-override configurations for use by the different corresponding ingress ports, and the forwarding circuitry is to forward packets received at the different corresponding ingress ports based on the forwarding table overridden by the different forwarding-table-override configurations.

Moreover, in accordance with an embodiment of the present disclosure the processor is to generate the forwarding-table-override configurations for the different corresponding ingress ports to indicate how the forwarding table is to be overridden for the different corresponding ingress ports.

Further in accordance with an embodiment of the present disclosure the processor is to generate the forwarding-table-override configurations for the different corresponding ingress ports to indicate how selected data of the forwarding table is to be ignored and/or validated for the different corresponding ingress ports.

Still further in accordance with an embodiment of the present disclosure the forwarding table is a multicast table including forwarding rules for different multicast identifications, and link aggregation group to egress port mapping data, and the processor is to generate the forwarding-table-override configuration for the given ingress port to indicate how selected data of the link aggregation group to egress port mapping data of the forwarding table is to be ignored and/or validated for at least one of the different multicast identifications.

Additionally in accordance with an embodiment of the present disclosure the different multicast identifications correspond to different groups of host devices.

Moreover, in accordance with an embodiment of the present disclosure the forwarding rules of the multicast table include replicating a packet back to where the packet originated, and the processor is to generate the forwarding-table-override configuration for the given ingress port to override replicating the packet back to where the packet originated as included in the multicast table responsively to the given ingress port not being an access port connected to a host device.

Further in accordance with an embodiment of the present disclosure the forwarding rules of the multicast table include replicating a packet back to where the packet originated, and the processor is to generate the forwarding-table-override configuration for the given ingress port to validate replicating the packet back to where the packet originated as included in the multicast table responsively to the given ingress port being an access port connected to a host device.

Still further in accordance with an embodiment of the present disclosure the processor is to generate the forwarding-table-override configuration for the given ingress port based on at least one characteristic of the given ingress port.

Additionally in accordance with an embodiment of the present disclosure the at least one characteristic of the given ingress port includes any one or more of the following the given ingress port is not an access port connected to a host device, the given ingress port is an access port connected to a host device, the given ingress port is connected to a part of a network fabric with a link failure, the given ingress port is connected to an uplink connection, and/or the given ingress port is connected to a downlink connection.

Moreover, in accordance with an embodiment of the present disclosure the processor is to generate the forwarding-table-override configuration for the given ingress port based on any one or more of the following removing a link aggregation group (LAG) to avoid a host failure, and/or removing LAGs to block parts of a network from communicating with each other using multicast messages.

There is also provided in accordance with another embodiment of the present disclosure, a method, including receiving forwarding-table-configuration packets from a network management node, forming a forwarding table based on the received forwarding-table-configuration packets, generating a forwarding-table-override configuration for a given ingress port to override at least one forwarding rule of the forwarding table for the given ingress port, and installing the forwarding table and the forwarding-table-override configuration for use by the given ingress port, and forwarding packets received at the given ingress port based on the forwarding table overridden by the forwarding-table-override configuration.

Further in accordance with an embodiment of the present disclosure the generating includes generating the forwarding-table-override configuration for the given ingress port to indicate how the forwarding table is to be overridden.

Still further in accordance with an embodiment of the present disclosure the generating includes generating the forwarding-table-override configuration for the given ingress port to indicate how selected data of the forwarding table is to be ignored and/or validated.

Additionally in accordance with an embodiment of the present disclosure the generating includes generating different forwarding-table-override configurations for different corresponding ingress ports to override forwarding rules of the forwarding table, the installing includes installing the forwarding table and the forwarding-table-override configurations for use by the different corresponding ingress ports, and the forwarding includes forwarding packets received at the different corresponding ingress ports based on the forwarding table overridden by the different forwarding-table-override configurations.

Moreover, in accordance with an embodiment of the present disclosure the generating includes generating the forwarding-table-override configurations for the different corresponding ingress ports to indicate how the forwarding table is to be overridden for the different corresponding ingress ports.

Further in accordance with an embodiment of the present disclosure the generating includes generating the forwarding-table-override configurations for the different corresponding ingress ports to indicate how selected data of the forwarding table is to be ignored and/or validated for the different corresponding ingress ports.

Still further in accordance with an embodiment of the present disclosure the forwarding table is a multicast table including forwarding rules for different multicast identifications, and link aggregation group to egress port mapping data, and the generating includes generating the forwarding-table-override configuration for the given ingress port to indicate how selected data of the link aggregation group to egress port mapping data of the forwarding table is to be ignored and/or validated for at least one of the different multicast identifications.

Additionally in accordance with an embodiment of the present disclosure the different multicast identifications correspond to different groups of host devices.

Moreover, in accordance with an embodiment of the present disclosure the forwarding rules of the multicast table include replicating a packet back to where the packet originated, and the generating includes generating the forwarding-table-override configuration for the given ingress port to override replicating the packet back to where the packet originated as included in the multicast table responsively to the given ingress port not being an access port connected to a host device.

Further in accordance with an embodiment of the present disclosure the forwarding rules of the multicast table include replicating a packet back to where the packet originated, and the generating includes generating the forwarding-table-override configuration for the given ingress port to validate replicating the packet back to where the packet originated as included in the multicast table responsively to the given ingress port being an access port connected to a host device.

Still further in accordance with an embodiment of the present disclosure the generating includes generating the forwarding-table-override configuration for the given ingress port based on at least one characteristic of the given ingress port.

Additionally in accordance with an embodiment of the present disclosure the at least one characteristic of the given ingress port includes any one or more of the following the given ingress port is not an access port connected to a host device, the given ingress port is an access port connected to a host device, the given ingress port is connected to a part of a network fabric with a link failure, and for the given ingress port is connected to an uplink connection, and/or the given ingress port is connected to a downlink connection.

Moreover, in accordance with an embodiment of the present disclosure the generating includes generating the forwarding-table-override configuration for the given ingress port based on any one or more of the following removing a link aggregation group (LAG) to avoid a host failure, and/or removing LAGs to block parts of a network from communicating with each other using multicast messages.

BRIEF DESCRIPTION OF THE DRAWINGS

The present invention will be understood from the following detailed description, taken in conjunction with the drawings in which.

DESCRIPTION OF EXAMPLE EMBODIMENTS

Overview

Figure 1:
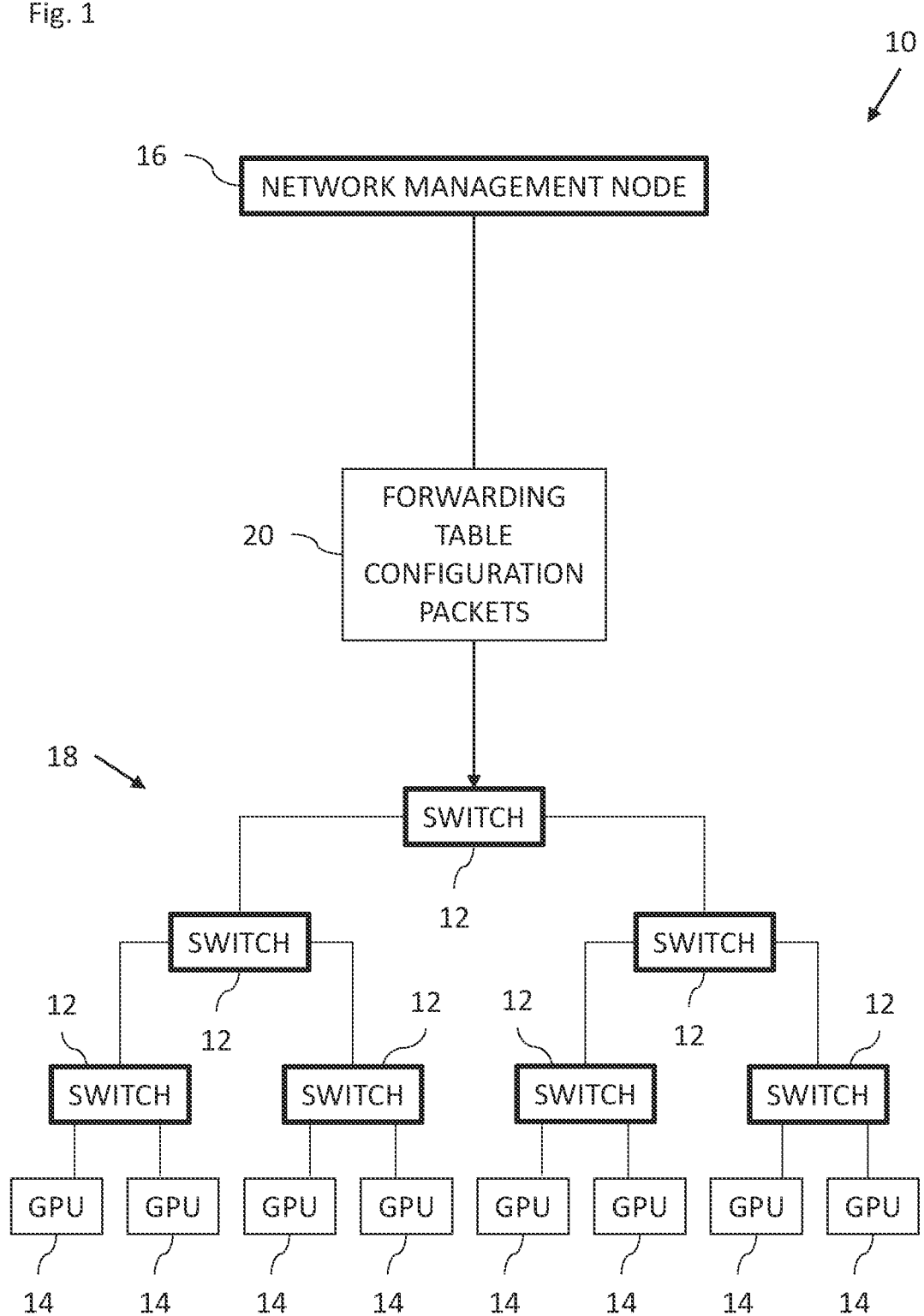
FIG. 1 is a block diagram view of computer system constructed and operative in accordance with an embodiment of the present invention.

As previously mentioned, in a reduction and aggregation process the network switches replicate packets from the initiating GPU to the other GPUs over the network. In some cases, packets (e.g., request messages) sent from a GPU to a switch, in addition to being forwarded to the various destination GPUs (optionally via other switches), may be replicated back to the initiating GPU as the initiating GPU also participates in the parallel computing job (e.g., reduction operation). For example, if GPU 0 sends a request to a layer 1 switch (L1) (layer 1 being the layer of switches at the bottom of a tree of network switches). Switch L1 replicates the request towards all GPUs in network (optionally via other switches in the tree) and replicates the request back to GPU 0 (on the same link or on a different link to GPU 0). However, packets coming from other nodes (e.g., from other switches in the tree or from other GPUs) may not necessarily be replicated back to those nodes depending on the details of the reduction and aggregation process. Therefore, switch L1 may need different forwarding tables for different ingress ports so that correct forwarding decision may be made with respect to whether to replicate a packet back to the originator of the packet (in addition to being replicated to one or more other GPUs or network switches in the network).

In general, as part of in-network reduction, a switch may multicast an incoming request message to multiple output ports towards different nodes (e.g., one or more switches and/or one or more end point devices, such as GPUs). Where the switch is connected to one or more of the different nodes (e.g., one or more switches and/or one or more end point devices) via multiple links (i.e., link aggregation), the different links available for forwarding may be indicated to the switch, and the switch chooses a single link from the available links. As previously discussed, the switch may or may not replicate a request back to the sender of the request, and the switch needs forwarding rules to apply this functionality.

Therefore, forwarding tables may become very complicated, especially when an in-network reduction is involved. The forwarding tables also typically need to be different for different ingress ports of the same switch so that the switch will apply the correct forwarding decisions for the different ingress ports. In such a scenario, the network load of providing the different forwarding tables per ingress port per switch results in too many forwarding table configuration packets being sent in the network and it also takes too long to set up the resulting ingress-port-specific forwarding tables in the switch. It is important that the forwarding tables are configured quickly to allow fast configuration of the network components by the network manager after fabric initialization (after reset etc.).

Embodiments of the present invention, solve at least some of the above drawbacks, by providing a system in which a forwarding table is provided by a network management node (e.g., subnet manager) to a switch. The switch generates forwarding-table-override configurations for corresponding ingress ports of the switch to override selective forwarding rules of the forwarding table provided by the network management node. The switch installs the forwarding table and the forwarding-table-override configurations for use by the corresponding ingress ports. For example, the forwarding table and the forwarding-table-override configuration for ingress port 1 is installed for use in forwarding packets received by ingress port 1, and the same forwarding table and the forwarding-table-override configuration for ingress port 2 is installed for use in forwarding packets received by ingress port 2, and so on.

Forwarding circuitry of the switch forwards packets received at the different ingress ports based on the forwarding table overridden by the different forwarding-table-override configurations. For example, the forwarding circuitry forwards packets received by ingress port 1 based on the forwarding table as overridden by the forwarding-table-override configuration for ingress port 1.

In some embodiments, the forwarding-table-override configuration for a given ingress port is maintained as a separate table from the forwarding table and indicates how the data of the forwarding table is to be overridden, and/or how selected data of the forwarding table is ignored and/or validated.

In some embodiments, the switch generates the forwarding-table-override configuration for a given ingress port based on one or more characteristics of that ingress port. For example, the characteristics may include any one or more of the following: the given ingress port is not an access port connected to a host device; the given ingress port is an access port connected to a host device; the given ingress port is connected to a part of a network fabric with a link failure; and/or the ingress port is connected to an uplink connection (e.g., to upper levels in the network fabric) or to a downlink connection (e.g., to a host or a switch in lower levels of the network fabric).

The forwarding-table-override configuration may also be configured based on other factors such as: (1) host failure (in which a LAG is removed from the forwarding table to avoid the host failure by suitably configuring the forwarding-table-override configuration); (2) fast isolation in which a user wants to block parts of the network from communicating with each other using MC messages (in which all the LAGs connected with the parts of the network to be blocked are removed from the forwarding table by suitably configuring the forwarding-table-override configuration). In some embodiments, the forwarding table is a multicast table including forwarding rules for different multicast identifications (MC IDs), and link aggregation group (LAG) to egress port mapping data. The MC IDs may indicate different groups of host devices.

For example, the multicast table may indicate, per MC ID, the LAG(s) associated with each egress port. The switch generates the forwarding-table-override configuration for a given ingress port to indicate how selected data of the link aggregation group to egress port mapping data of the forwarding table is to be ignored and/or validated for one or more of the MC IDs. For example, the forwarding-table-override configuration may indicate that for LAG 0x1 for MC ID 0x2 the forwarding table should be ignored by the forwarding circuitry, and for LAG 0x4 for MC ID 0x3 the forwarding table should be validated (i.e., followed) by the forwarding circuitry.

In some case, the forwarding rules of the multicast table may include replicating a packet (e.g., request) back to where the packet originated. As previously mentioned, this may occur in reduction and aggregation processes if the request originates from a host device connected to the switch. In such a case, the switch generates the forwarding-table-override configuration for a given ingress port to override replicating a packet back to where the packet originated (as included in the original multicast table) based on the given ingress port not being an access port connected to a host device. However, the switch generates the forwarding-table-override configuration for the given ingress port to validate replicating the packet back to where the packet originated (as included in the original multicast table) based on the given ingress port being an access port connected to a host device.

Embodiments of the present invention allow the switch to override a forwarding table based on characteristics of the ingress port or topology without input from an external controller (e.g., subnet manager). Embodiments of the present invention provide resiliency. For example, if the switch knows that an egress port has a link failure or a host failure connected to the LAG, the forwarding table can be overridden on the fly to avoid that egress port and/or LAG. Embodiments of the present invention allow hardware and firmware to use the same multicast forwarding table in all ingress ports and provide unique behavior per ingress port based on the ingress port characteristics in the fabric without stressing the subnet manager or network.

System Description

Reference is now made to FIG. 1, which is a block diagram view of computer system 10 constructed and operative in accordance with an embodiment of the present invention. The system 10 includes a network management mode 16 (e.g., including a subnet manager) and a plurality of network switches 12, a plurality of end point devices 14 (e.g., graphics processing units (GPUs)). Seven switches 12 and eight end point devices 14 are shown for the sake of simplicity. The system 10 may include any suitable numbers (and arrangement) of switches 12 and end point devices 14. The network switch 12 and end point devices 14 may be connected via links. One or more of the links may include multiple links (link aggregation) connecting the same pair of nodes.

In the example of FIG. 1, one of the end point devices 14 sends a request to the other end point devices 14 to perform a parallel computing job (e.g., a reduction and aggregation process) over a network 18 via the switches 12. The switches 12 may also participate in the parallel computing job, for example, by summing values or performing any other supported arithmetic operation.

Each of the switches 12 are configured to receive forwarding-table-configuration packets 20 from the network management node 16, as described in more detail with reference to FIGS. 2 and 3. The forwarding-table-configuration packets 20 are used by each of the respective switches 12 to generate a forwarding table. The resulting forwarding tables may be different for each switch.

Figure 2:
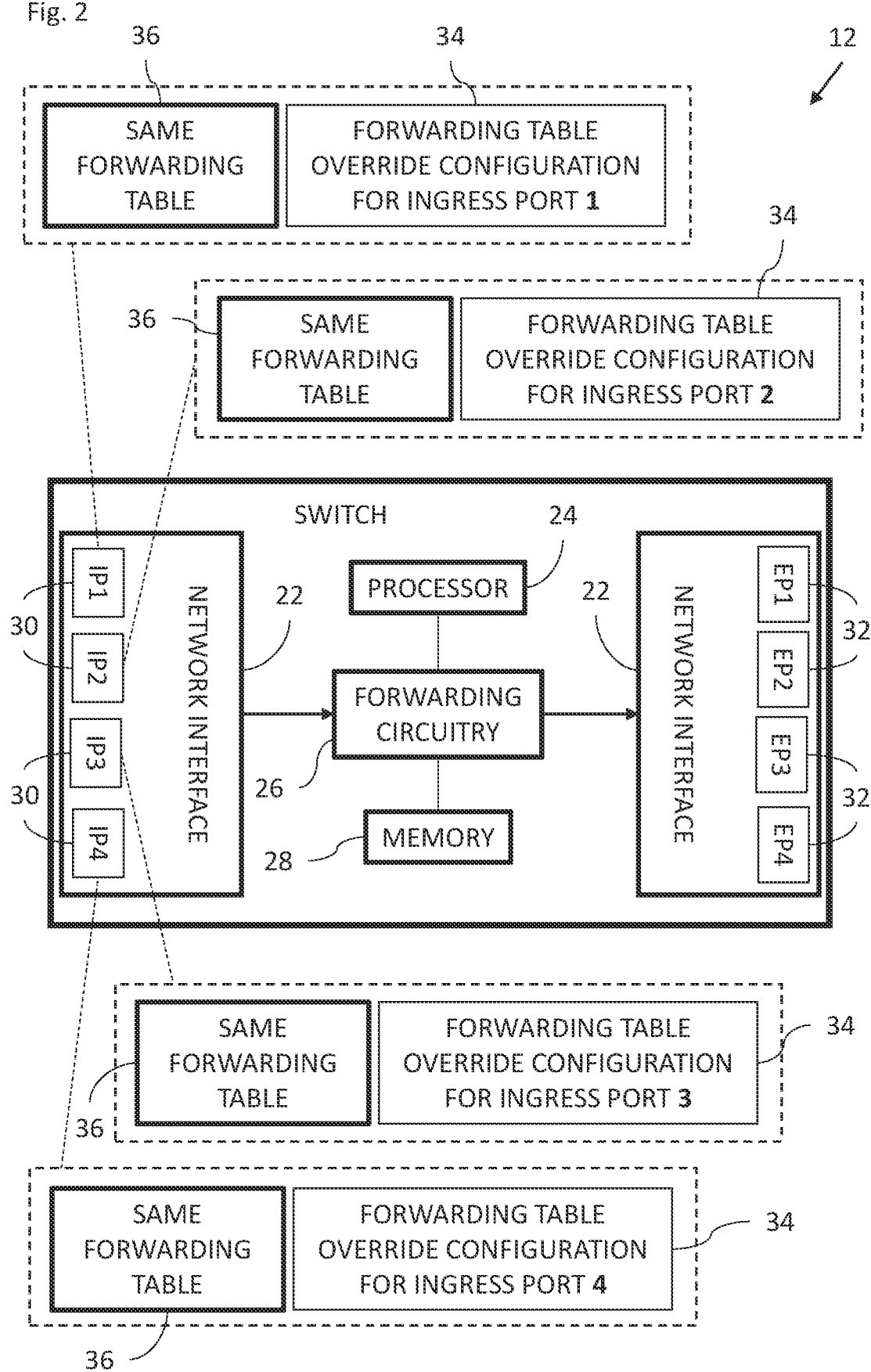
FIG. 2 is a block diagram view of a network switch in the system of FIG. 1.

Reference is now made to FIG. 2, which is a block diagram view of one of the network switches 12 in the system 10 of FIG. 1. The network switch 12 includes a network interface 22, a processor 24, forwarding circuitry 26, and a memory 28. The network interface 22 includes a plurality of ports that may be configured as ingress ports 30 (labeled IP1, IP2, etc.) and/or egress ports 32 (labeled EP1, EP2, etc.). For the sake of simplicity the ports are shown in FIG. 2 as either ingress ports 30 or egress ports 32 with one part of the network interface 22 on the left hand side of the network switch 12 and another part of the network interface 22 on the right hand side of the network switch 12. It should be noted that the network interface 22 may be implemented in one or more parts. It should also be noted that each of the ports may be configured as an ingress port and/or an egress port. For example, a packet received on an ingress port may be returned on the same port, which is also configured as an egress port.

FIG. 2 shows that the same forwarding table 36 is installed for each ingress port 30 and a different forwarding-table-override configuration 34 is installed for each ingress port 30, as will be described in more detail with reference to FIG. 3. The memory 28 may be used to store the forwarding-table-override configurations 34 and the forwarding table 36.

Figure 3:
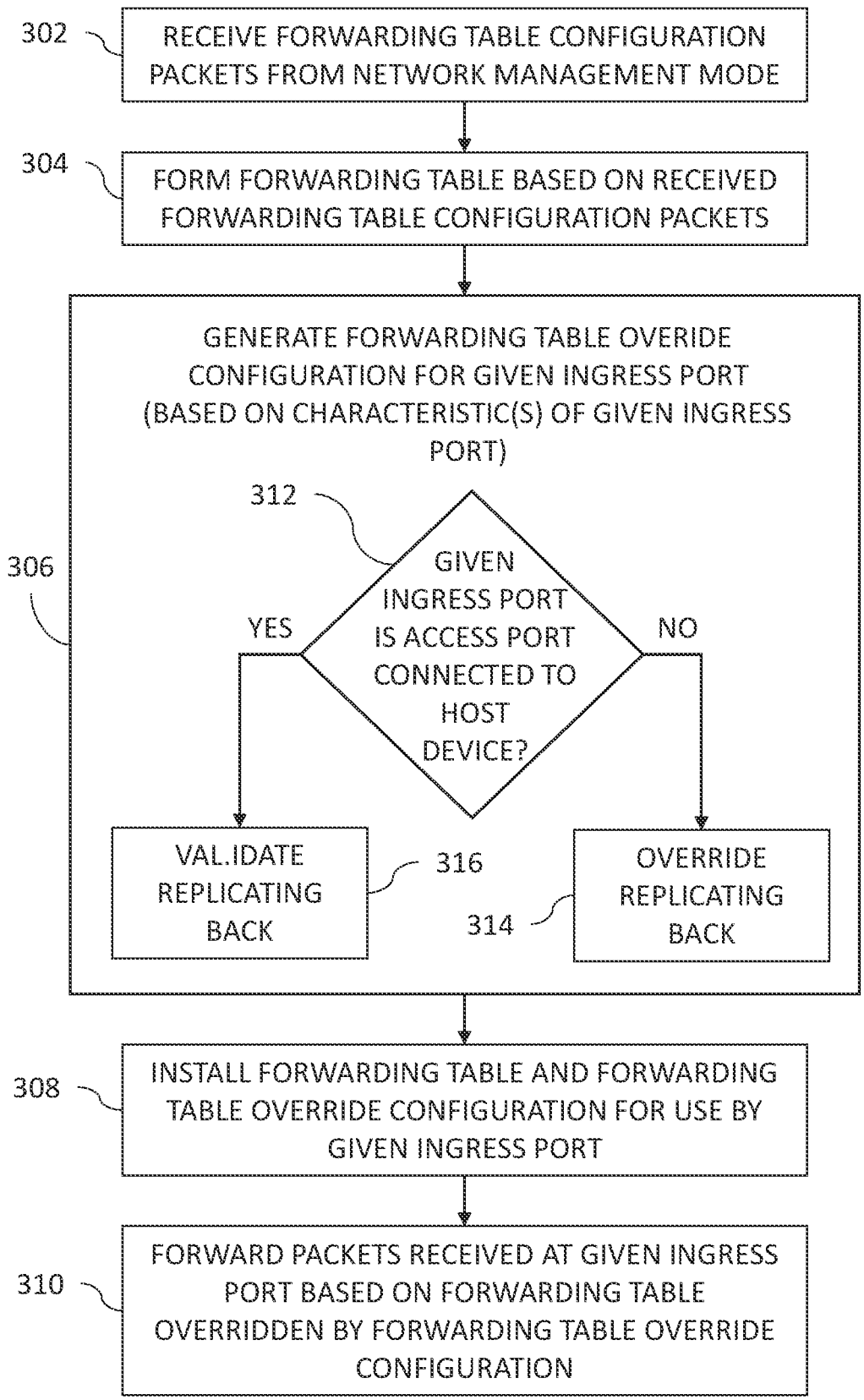
FIG. 3 is a flowchart including steps in a method of operation of the network switch of FIG. 2.

Reference is now made to FIG. 3, which is a flowchart 300 including steps in a method of operation of the network switch 12 of FIG. 2. Reference is also made to FIG. 2. The network interface 22 is configured to receive forwarding-table-configuration packets 20 from the network management mode 16 (block 302). The processor 24 is configured to form the forwarding table 36 based on the received forwarding-table-configuration packets 20 (block 304).

The processor 24 is configured to generate the forwarding-table-override configuration 34 for a given ingress port (e.g., IP1) of the ingress ports 30 to override at least one forwarding rule of the forwarding table 36 for the given ingress port 30 (block 306). In some embodiments, the processor 24 is configured to generate the forwarding-table-override configuration 34 for the given ingress port 30 to indicate how the forwarding table 36 is configured to be overridden. In some embodiments, the processor 24 is configured to generate the forwarding-table-override configuration 34 for the given ingress port 30 to indicate how selected data of the forwarding table 36 is configured to be ignored and/or validated.

In some embodiments, a forwarding-table configuration (not shown) may be received by the network switch 12 from the network management mode 16. The processor 24 may be configured to tailor the received forwarding-table configuration for each of the ingress ports 30 to yield the various forwarding-table-override configurations 34.

In some embodiments, the processor 24 is configured to generate the forwarding-table-override configuration 34 for the given ingress port 30 based on one or more characteristics of the given ingress port 30. Examples of how characteristics of the given ingress port 30 are used is described in more detail with reference FIG. 4. In some embodiments, the characteristic(s) of the given ingress port 30 may include any one or more of the following: the given ingress port 30 is not an access port connected to a host device; the given ingress port 30 is an access port connected to a host device; the given ingress port 30 is connected to a part of a network fabric with a link failure; the given ingress port 30 is connected to an uplink connection; and/or the given ingress port 30 is connected to a downlink connection.

The forwarding-table-override configuration 34 may also be configured based on other factors such as: (1) host failure (in which the processor 24 may remove a LAG from the forwarding table 36 to avoid the host failure by suitably configuring the forwarding-table-override configuration 34); and (2) fast isolation in which a user wants to block parts of the network from communicating with each other using MC messages (the processor 24 may remove all the LAGs connected with the parts of the network to be blocked).

The processor 24 is configured to install the forwarding table 36 and the forwarding-table-override configuration 34 for use by the given ingress port 30 (block 308). In some embodiments, the forwarding table 36 formed from the forwarding-table-configuration packets 20 is unchanged by the processor 24 based on the forwarding-table-override configuration 34 and the original forwarding table 36 is used together with the forwarding-table-override configuration 34 to provide forwarding decisions based on how the forwarding-table-override configuration 34 overrides the forwarding table 36. In other embodiments, the processor 24 updates the data of the forwarding table 36 for each ingress port 30 based on the forwarding-table-override configuration 34 for that ingress port 30.

The forwarding circuitry 26 is configured to forward packets received at the given ingress port 30 based on the forwarding table 36 overridden by the forwarding-table-override configuration 34 (block 310).

The above steps of blocks 306-310 are performed for other ingress ports 30 of the network interface 22. Therefore, the processor 24 is configured to generate different forwarding-table-override configurations 34 for different corresponding ingress ports 30 to override forwarding rules of the forwarding table 36, and install the forwarding table 36 and the forwarding-table-override configurations 34 for use by the different corresponding ingress ports 30. In some embodiments, the processor 24 is configured to generate the forwarding-table-override configurations 34 for the different corresponding ingress ports 30 to indicate how the forwarding table 36 is configured to be overridden for the different corresponding ingress ports 30. In some embodiments, the processor 24 is configured to generate the forwarding-table-override configurations 34 for the different corresponding ingress ports 30 to indicate how selected data of the forwarding table 36 is configured to be ignored and/or validated for the different corresponding ingress ports 30.

For example, the forwarding table 36 and the forwarding-table-override configuration 34 for ingress port IP1 is installed for use in forwarding packet received by ingress port IP1, and the same forwarding table 36 and the forwarding-table-override configuration 36 for ingress port IP2 is installed for use in forwarding packets received by ingress port IP2, and so on. Therefore, each ingress port 30 uses the same forwarding table 36 and the forwarding-table-override configuration 34 tailored to that ingress port 30.

The forwarding circuitry 26 is configured to forward packets received at the different corresponding ingress ports 30 based on the forwarding table 36 overridden by the different forwarding-table-override configurations 34. For example, the forwarding circuitry 26 is configured to forwards packets received by ingress port IP1 based on the forwarding table 36 as overridden by the forwarding-table-override configuration 34 for ingress port IP1.

Figure 4:
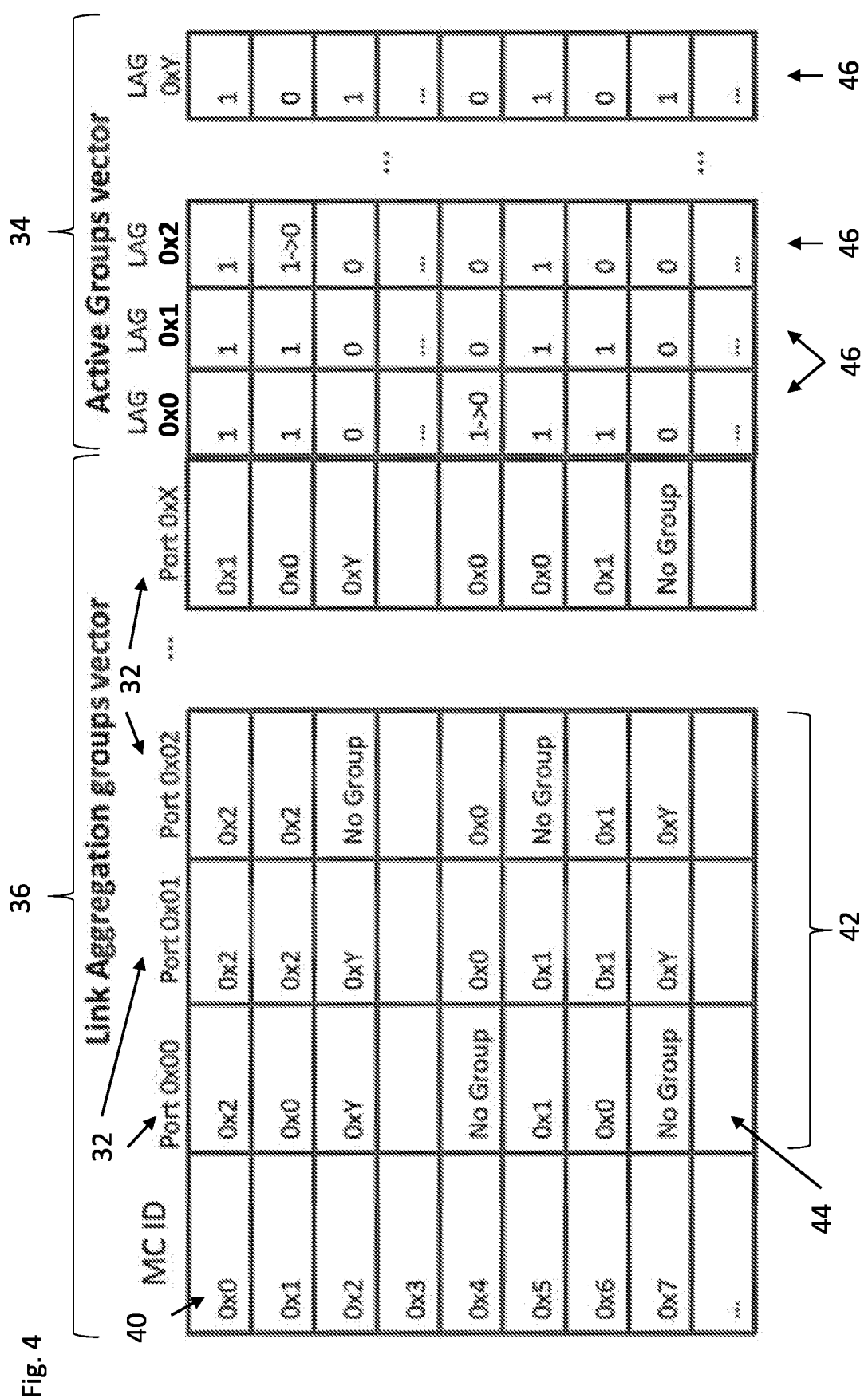
FIG. 4 is an example of a forwarding table with a forwarding table override configuration for use in the network switch of FIG. 2.

Reference is now made to FIG. 4, which is an example of a forwarding table 36 with a forwarding table override configuration 34 for a given ingress port 30 for use in the network switch 12 of FIG. 2. Reference is also made to FIG. 3.

In some embodiments, the forwarding table 36 is a multicast table (as shown in FIG. 4) including forwarding rules for different multicast identifications 40 (MC-IDs), and link aggregation group to egress port mapping data 42. The different multicast identifications 40 may correspond to different groups of host devices (e.g., end point devices 14). For example, each group of host devices may correspond to a group of host devices participating in a parallel computing job.

The forwarding table 36 includes a first column listing the multicast identifications 40 and subsequent columns listing the egress ports 32 (e.g., Port 0x00, Port 0x01 . . . ). In each of the columns of the egress ports 32, the fields include link aggregation group (LAG) data 44. For example, Port 0x01 includes LAG 0x2 for MC ID 0x1. The link aggregation group data 44 indicates the available egress ports 32 to choose from for each LAG per MC ID. For example, the forwarding table 36 indicates that a packet with MC ID 0x1 could be forwarded to egress port 0x01 or 0x02 according to LAG 0x2.

The forwarding-table-override configuration 34 includes columns 46 for each LAG whether the link aggregation group data 44 in the forwarding table 36 should be ignored or validated, as described in more detail below.

In some embodiments, the processor 24 is configured to generate the forwarding-table-override configuration 34 for a given ingress port 30 to indicate how selected link aggregation group data 44 of the link aggregation group to egress port mapping data 42 of the forwarding table 36 is configured to be ignored and/or validated for one or more of the different multicast identifications 40.

In some embodiments, the forwarding rules of the multicast table 36 may include replicating a packet back to where the packet originated. The processor 24 is configured to check (at decision block 312) if the given ingress port 30 is an access port connected to a host device (of the MC ID of the received packet). If the given ingress port 30 is not an access port connected to a host device (of the MC ID of the received packet), the processor 24 is configured to generate the forwarding-table-override configuration 34 for the given ingress port 30 to override replicating the packet back to where the packet originated as included in the multicast table 36 (block 314). If the given ingress port 30 is an access port connected to a host device (of the MC ID of the received packet), the processor 24 is configured to generate the forwarding-table-override configuration 34 for the given ingress port 30 to validate replicating the packet back to where the packet originated as included in the multicast table 36 (block 316).

It should be noted that in the example of FIG. 4, not all the egress port 32 columns are shown and not all the LAG columns 46 are shown. Therefore, the explanation below is based on the visible columns. So, for example in the first row (MC ID equal to 0x0), LAG 0x1 may appear in more egress port 32 columns than only egress port 0xX, as shown in FIG. 4.

For each LAG in the active group vector of the forwarding-table-override configuration 34, there is generally at least one egress port 32 associated with that LAG. For each MC ID 40, the active group vector of the forwarding-table-override configuration 34 indicates which LAGs in the link aggregation group to egress port mapping data 42 are active (indicated using a "1") and should be used by the forwarding circuitry 26 when making forwarding decisions from the forwarding table 36, and which LAGs are inactive (indicated using a "0") and should be ignored by the forwarding circuitry 26 when making forwarding decisions from the forwarding table 36. The notation "1→0)" is used in the forwarding-table-override configuration 34 of FIG. 4 to indicate that the processor 24 determined to override a forwarding rule of the forwarding table 36 for that LAG and MC ID combination updating the LAG from active to inactive.

For example, if the value of a LAG in the forwarding-table-override configuration 34 is equal to 1 (i.e., active) for a given MC ID 40 (e.g., LAG 0x0 of MC ID 0x1), then that LAG (e.g., 0x0) is searched for by the forwarding circuitry 26 in the link aggregation group to egress port mapping data 42, and the found entries in the link aggregation group to egress port mapping data 42 are considered by the forwarding circuitry 26, and one of the egress ports 32 (e.g., either egress port 0x00 or (xX) associated with that LAG (e.g., (x0) in the link aggregation group to egress port mapping data 42 is selected to forward a packet received by the relevant ingress port 30. For every active LAG indicated in the forwarding-table-override configuration 34 using a "1", the forwarding circuitry 26 is configured to select a single egress port 32 over which to send packet for the relevant MC ID of the received packet.

By way of another example, if the value of a LAG in the forwarding-table-override configuration 34 is equal to 0 for a given MC ID 40 (e.g., LAG 0xY of MC ID 0x1), then that LAG (e.g., 0x0) is ignored by the forwarding circuitry 26 in the link aggregation group to egress port mapping data 42. There may be non-valid MC IDs, and a packet arriving with one of those MC IDs will be dropped by the forwarding circuitry 26.

Forwarding decisions of the forwarding circuitry 26 are now described below with respect to the available data of the forwarding-table-override configuration 34 and the forwarding table 36 as shown in FIG. 4.

If a packet arrives having an MC ID of 0x0 then the packet will be sent to port 0xX (as LAG 0x1 is active in the forwarding-table-override configuration 34 for that MC ID) and one of ports 0x00 or 0x01 or 0x02 (as LAG 0x2 is active in the forwarding-table-override configuration 34 for that MC ID). This may be an example where the ingress port for the received packet is connected to a host associated with one of the hosts from MC ID 0x0.

If a packet arrives having an MC ID of 0x1 then the packet would have been sent to port 0x00 or 0xX and to port 0x01 or 0x02 based on the original forwarding table 36. However, due to the override of LAG 0x2 from active to inactive in the forwarding-table-override configuration 34 for that MC ID, the packet is only sent to port 0x00 or 0x0X. This may be an example where the ingress port for the received packet is not connected to a host associated with one of the hosts from MC ID 0x1.

If a packet arrives having an MC ID of 0x2 then the packet will be sent to one of ports 0x00 or 0x01 or 0xX as LAG 0xY is the only active LAG in forwarding-table-override configuration 34 for that MC ID.

If a packet arrives having an MC ID of 0x3 it will be dropped as there are no active LAGs in the forwarding-table-override configuration 34 for that MC ID.

If a packet arrives having an MC ID of 0x4 then the packet would have been sent to ports 0x01 or 0x02, or 0xX according to the original forwarding table 36. However, due to the override of LAG group 0x0 in the forwarding-table-override configuration 34, the packet is dropped.

If a packet arrives having an MC ID of 0x5 then the packet will be sent to port 0xX and one of ports 0x00 or 0x01 as all the LAGs are active in the forwarding-table-override configuration 34. This may be an example where the ingress port for received packet is connected to a host associated with one of the hosts from MC ID 0x5.

If a packet arrives having an MC ID of 0x6 then the packet will be sent to port 0x00 and one of ports 0x01 or 0x02 or 0x0X as LAGs 0x0 and 0x1 are active in the forwarding-table-override configuration 34. This may be an example where the ingress port for the received packet is connected to a host associated with one of the hosts from MC ID 0x6.

If a packet arrives having an MC ID of 0x7 then the packet will be sent to port 0x01 or 0x02.

In practice, some or all of the functions of the processor 24 may be combined in a single physical component or, alternatively, implemented using multiple physical components. These physical components may comprise hard-wired or programmable devices, or a combination of the two. In some embodiments, at least some of the functions of the processor 24 may be carried out by a programmable processor under the control of suitable software. This software may be downloaded to a device in electronic form, over a network, for example. Alternatively, or additionally, the software may be stored in tangible, non-transitory computer-readable storage media, such as optical, magnetic, or electronic memory.

Various features of the invention which are, for clarity, described in the contexts of separate embodiments may also be provided in combination in a single embodiment. Conversely, various features of the invention which are, for brevity, described in the context of a single embodiment may also be provided separately or in any suitable sub-combination.

The embodiments described above are cited by way of example, and the present invention is not limited by what has been particularly shown and described hereinabove. Rather the scope of the invention includes both combinations and sub-combinations of the various features described hereinabove, as well as variations and modifications thereof which would occur to persons skilled in the art upon reading the foregoing description and which are not disclosed in the prior art.

What is claimed is:

1. A network switch device, comprising:
    a network interface comprising ingress ports and egress ports, and configured to receive forwarding-table-configuration packets from a network management node;
    a processor to:
        form a forwarding table based on the received forwarding-table-configuration packets;
        generate a forwarding-table-override configuration for a given ingress port of the ingress ports to override at least one forwarding rule of the forwarding table for the given ingress port; and
        install the forwarding table and the forwarding-table-override configuration for use by the given ingress port; and
    forwarding circuitry to forward packets received at the given ingress port based on the forwarding table overridden by the forwarding-table-override configuration, and wherein:
    the forwarding table is a multicast table including forwarding rules for different multicast identifications, and link aggregation group to egress port mapping data; and
    the processor is to generate the forwarding-table-override configuration for the given ingress port to indicate that selected data of the link aggregation group to egress port mapping data of the forwarding table is to be ignored and/or validated for at least one of the different multicast identifications.

2. The device according to claim 1, wherein the processor is to generate the forwarding-table-override configuration for the given ingress port to indicate that the selected data of the forwarding table is to be overridden.

3. The device according to claim 1, wherein the processor is to generate the forwarding-table-override configuration for the given ingress port to indicate that the selected data of the forwarding table is to be ignored and/or validated.

4. The device according to claim 1, wherein:
    the processor is to:
        generate different forwarding-table-override configurations for different corresponding ones of the ingress ports to override the forwarding rules of the forwarding table; and
        install the forwarding table and the forwarding-table-override configurations for use by the different corresponding ingress ports; and
    the forwarding circuitry is to forward packets received at the different corresponding ingress ports based on the forwarding table overridden by the different forwarding-table-override configurations.

5. The device according to claim 4, wherein the processor is to generate the forwarding-table-override configurations for the different corresponding ingress ports to indicate that the selected data of the forwarding table is to be overridden for the different corresponding ingress ports.

6. The device according to claim 4, wherein the processor is to generate the forwarding-table-override configurations for the different corresponding ingress ports to indicate that the selected data of the forwarding table is to be ignored and/or validated for the different corresponding ingress ports.

7. The device according to claim 1, wherein the different multicast identifications correspond to different groups of host devices.

8. The device according to claim 1, wherein:
the forwarding rules of the multicast table include replicating a packet back to where the packet originated; and
the processor is to generate the forwarding-table-override configuration for the given ingress port to override replicating the packet back to where the packet originated as included in the multicast table responsively to the given ingress port not being an access port connected to a host device.

9. The device according to claim 1, wherein:
the forwarding rules of the multicast table include replicating a packet back to where the packet originated; and
the processor is to generate the forwarding-table-override configuration for the given ingress port to validate replicating the packet back to where the packet originated as included in the multicast table responsively to the given ingress port being an access port connected to a host device.

10. The device according to claim 1, wherein the processor is to generate the forwarding-table-override configuration for the given ingress port based on at least one characteristic of the given ingress port.

11. The device according to claim 10, wherein the at least one characteristic of the given ingress port includes any one or more of the following: the given ingress port is not an access port connected to a host device; the given ingress port is an access port connected to a host device; the given ingress port is connected to a part of a network fabric with a link failure; the given ingress port is connected to an uplink connection; and/or the given ingress port is connected to a downlink connection.

12. The device according to claim 1, wherein the processor is to generate the forwarding-table-override configuration for the given ingress port based on any one or more of the following: removing a link aggregation group (LAG) to avoid a host failure; and/or removing LAGs to block parts of a network from communicating with each other using multicast messages.

13. A method, comprising:
receiving forwarding-table-configuration packets from a network management node;
forming a forwarding table based on the received forwarding-table-configuration packets;
generating a forwarding-table-override configuration for a given ingress port to override at least one forwarding rule of the forwarding table for the given ingress port; and
installing the forwarding table and the forwarding-table-override configuration for use by the given ingress port; and
forwarding packets received at the given ingress port based on the forwarding table overridden by the forwarding-table-override configuration, and wherein:
the forwarding table is a multicast table including forwarding rules for different multicast identifications, and link aggregation group to egress port mapping data; and
the generating includes generating the forwarding-table-override configuration for the given ingress port to indicate that selected data of the link aggregation group to egress port mapping data of the forwarding table is to be ignored and/or validated for at least one of the different multicast identifications.

14. The method according to claim 13, wherein the generating includes generating the forwarding-table-override configuration for the given ingress port to indicate that the selected data of the forwarding table is to be overridden.

15. The method according to claim 13, wherein the generating includes generating the forwarding-table-override configuration for the given ingress port to indicate that the selected data of the forwarding table is to be ignored and/or validated.

16. The method according to claim 13, wherein:
the generating includes generating different forwarding-table-override configurations for different corresponding ingress ports to override the forwarding rules of the forwarding table;
the installing includes installing the forwarding table and the forwarding-table-override configurations for use by the different corresponding ingress ports; and
the forwarding includes forwarding packets received at the different corresponding ingress ports based on the forwarding table overridden by the different forwarding-table-override configurations.

17. The method according to claim 16, wherein the generating includes generating the forwarding-table-override configurations for the different corresponding ingress ports to indicate that the selected data of the forwarding table is to be overridden for the different corresponding ingress ports.

18. The method according to claim 16, wherein the generating includes generating the forwarding-table-override configurations for the different corresponding ingress ports to indicate that the selected data of the forwarding table is to be ignored and/or validated for the different corresponding ingress ports.

19. The method according to claim 13, wherein the different multicast identifications correspond to different groups of host devices.

20. The method according to claim 13, wherein:
the forwarding rules of the multicast table include replicating a packet back to where the packet originated; and
the generating includes generating the forwarding-table-override configuration for the given ingress port to override replicating the packet back to where the packet originated as included in the multicast table responsively to the given ingress port not being an access port connected to a host device.

21. The method according to claim 13, wherein:
the forwarding rules of the multicast table include replicating a packet back to where the packet originated; and the generating includes generating the forwarding-table-override configuration for the given ingress port to validate replicating the packet back to where the packet originated as included in the multicast table responsively to the given ingress port being an access port connected to a host device.

22. The method according to claim 13, wherein the generating includes generating the forwarding-table-override configuration for the given ingress port based on at least one characteristic of the given ingress port.

23. The method according to claim 22, wherein the at least one characteristic of the given ingress port includes any one or more of the following: the given ingress port is not an access port connected to a host device; the given ingress port is an access port connected to a host device; the given ingress port is connected to a part of a network fabric with a link failure; and/or the given ingress port is connected to an uplink connection; and/or the given ingress port is connected to a downlink connection.

24. The method according to claim 13, wherein the generating includes generating the forwarding-table-override configuration for the given ingress port based on any one or more of the following: removing a link aggregation group (LAG) to avoid a host failure; and/or removing LAGs to block parts of a network from communicating with each other using multicast messages.

* * * * *